United States Patent
Hoshii

(10) Patent No.: US 10,800,184 B2
(45) Date of Patent: Oct. 13, 2020

(54) DETERMINING METHOD OF DENSITY CORRECTION VALUE, PRINTING APPARATUS, PRINTING METHOD, AND METHOD OF CORRECTING PRINTING DENSITY

(71) Applicant: SEIKO EPSON CORPORATION, Tokyo (JP)

(72) Inventor: Jun Hoshii, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/565,557

(22) Filed: Sep. 10, 2019

(65) Prior Publication Data

US 2020/0079105 A1    Mar. 12, 2020

(30) Foreign Application Priority Data

Sep. 12, 2018   (JP) ................. 2018-170179

(51) Int. Cl.
*B41J 2/36*     (2006.01)
*B41J 2/175*    (2006.01)
(Continued)

(52) U.S. Cl.
CPC .......... *B41J 2/362* (2013.01); *B41J 2/17566* (2013.01); *B41J 29/393* (2013.01); *G06K 15/027* (2013.01);
(Continued)

(58) Field of Classification Search
CPC ...... B41J 2/17566; B41J 2/362; B41J 29/393; H04N 1/6041; H04N 1/605; H04N 1/6055; G06K 15/027; G06K 15/105
See application file for complete search history.

(56) References Cited

U.S. PATENT DOCUMENTS

2006/0256408 A1* 11/2006 Yoshida ............... H04N 1/4078
                                                              358/518
2009/0237430 A1    9/2009 Tatsumi
(Continued)

FOREIGN PATENT DOCUMENTS

JP    2008-080677 A    4/2008

OTHER PUBLICATIONS

The Extended European Search Report for the corresponding European Patent Application No. 19196786.8 dated Jan. 20, 2020.

*Primary Examiner* — Anh T Vo
(74) *Attorney, Agent, or Firm* — Global IP Counselors, LLP

(57) ABSTRACT

A density correction value determining method of correcting a printing density in a printing apparatus that performs printing by ejecting ink from a plurality of nozzles onto a medium, includes printing a test pattern by ejecting ink from the plurality of nozzles, acquiring captured image data by imaging printed test pattern, calculating a first density correction value for bringing the printing density closer to a predetermined reference value set when one raster is formed by ejecting ink from each single nozzle of the plurality of nozzles based on a density of acquired captured image data, and calculating a second density correction value for bringing the printing density closer to a predetermined reference value set when one raster is formed by combining different nozzles of the plurality of nozzles based on the calculated first density correction value.

8 Claims, 12 Drawing Sheets

(51) Int. Cl.
*B41J 29/393* (2006.01)
*H04N 1/60* (2006.01)
*G06K 15/10* (2006.01)
*G06K 15/02* (2006.01)

(52) U.S. Cl.
CPC ........... *G06K 15/105* (2013.01); *H04N 1/605* (2013.01); *H04N 1/6041* (2013.01); *H04N 1/6055* (2013.01)

(56) References Cited

U.S. PATENT DOCUMENTS

| | | | |
|---|---|---|---|
| 2009/0278882 A1 | 11/2009 | Yoshida et al. | |
| 2011/0234677 A1* | 9/2011 | Tokunaga | B41J 29/393 347/19 |
| 2012/0206525 A1 | 8/2012 | Tanase et al. | |
| 2013/0187970 A1* | 7/2013 | Inoue | B41J 2/2142 347/14 |
| 2013/0278670 A1* | 10/2013 | Tanase | B41J 2/2132 347/19 |
| 2015/0296095 A1 | 10/2015 | Kawafuji et al. | |

\* cited by examiner

DETERMINING METHOD OF DENSITY CORRECTION VALUE, PRINTING APPARATUS, PRINTING METHOD, AND METHOD OF CORRECTING PRINTING DENSITY

The present application is based on, and claims priority from JP Application Serial Number 2018-170179, filed Sep. 12, 2018, the disclosure of which is hereby incorporated by reference herein in its entirety.

BACKGROUND

1. Technical Field

The present disclosure relates to correction of a printing density.

2. Related Art

There is a known printing apparatus that forms an image configured with multiple dots on a printing medium by moving a printing head having multiple nozzles for ejecting ink in a main scan direction and transporting the printing medium in a sub-scan direction intersecting the main scan direction. In the printing apparatus, a landing location of an ink droplet deviates from a planned location due to fluctuation of an ink ejection amount for each nozzle, fluctuation of a flying direction of the ink droplets, and the like, and a printed image may appear as a dark and light streak (banding) in the main scan direction or a transport direction. JP-A-2008-80677 discloses a technology for suppressing occurrence of banding, which is a technology that prints a correction pattern for each printing mode in which weights of the ink droplets used for printing or printing resolutions are different from each other, detects a dot density based on a location between adjacent dot arrays before and after the sub-scan direction in the obtained printing image, calculates a correction value for reducing unevenness of a printing density of the dot array for each printing mode according to the detected dot density, and performs normal printing by applying the correction values.

However, in the technology described in JP-A-2008-80677, when the printing apparatus has multiple printing modes, it takes time to calculate a correction value for reducing unevenness of a printing density.

SUMMARY

According to one embodiment of the present disclosure, a determining method of a density correction value for correcting a printing density in a printing apparatus that performs printing by ejecting ink from a plurality of nozzles onto a medium is provided. The density correction value determining method includes printing a test pattern by ejecting the ink from the plurality of nozzles; acquiring captured image data by imaging the printed test pattern; calculating a first density correction value for bringing the printing density closer to a predetermined reference value set when one raster is formed by ejecting the ink from each single nozzle of the plurality of nozzles, based on a density of the acquired captured image data; and calculating a second density correction value for bringing the printing density closer to a predetermined reference value set when the one raster is formed by combining different nozzles of the plurality of nozzles, based on the calculated first density correction value.

DESCRIPTION OF EXEMPLARY EMBODIMENTS

A. First Embodiment

A1. Configuration of Apparatus

Figure 1:
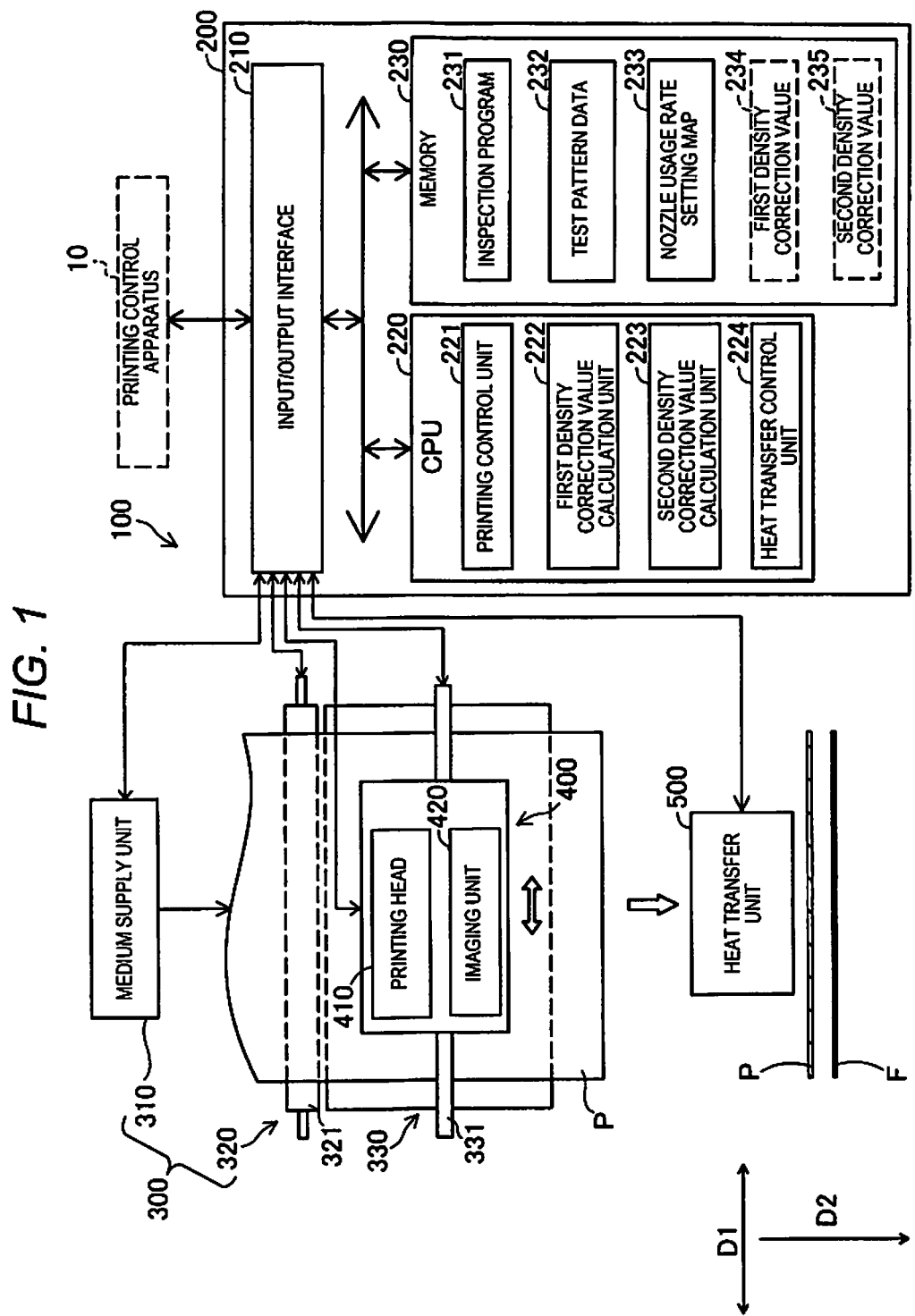
FIG. 1 is a block diagram illustrating a schematic configuration of a printing apparatus.

FIG. 1 is a block diagram illustrating a schematic configuration of a printing apparatus 100 as one embodiment of the present disclosure. The printing apparatus 100 is an ink jet printer of a sublimation transfer type. The printing apparatus 100 converts image data input from a printing control apparatus 10 into printing data, ejects ink from a plurality of nozzles 92 onto a printing medium (hereinafter, referred to as a "transfer sheet") P such as transfer paper based on the printing data, thereby, forming dots on the transfer sheet P to print an image, a character, or the like. In addition, the printing apparatus 100 thermally transfers the image, the character, or the like printed on the transfer sheet P to a recording medium F such as polyester fabric using sublimation transfer. The sublimation transfer of the printed image, character, or the like on the recording medium F may be realized by another heat transfer apparatus different from the printing apparatus 100.

In the present embodiment, the printing apparatus 100 sets a density correction value which will be described below in an inspection line before shipment. The printing apparatus 100 in which the density correction value is set is shipped to and is installed in a design office or the like and performs normal printing using the set density correction value. When a printing head 410, which will be described below, included in the printing apparatus 100 is replaced, and the like, density correction may be performed on site.

In addition to the printing apparatus 100, the printing control apparatus 10 is illustrated in FIG. 1. The printing control apparatus 10 is configured to be able to communicate with the printing apparatus 100 and transmits image data to be printed to the printing apparatus 100 to perform printing. In the present embodiment, the printing control apparatus 10 is configured by a computer.

The printing apparatus 100 includes a medium supply transport unit 300, a carriage 400 on which a printing head 410 and an imaging unit 420 are mounted, a carriage movement unit 330, a heat transfer unit 500, and a control unit 200. The printing apparatus 100 controls the medium supply transport unit 300, the carriage movement unit 330, and the carriage 400 and prints a character, an image, or the like on the transfer sheet P based on printing data converted from the image data input from the printing control apparatus 10. In FIG. 1, the carriage 400 reciprocates along a main scan direction D1, and the transfer sheet P is transported from upstream to downstream in a sub-scan direction D2. The sub-scan direction D2 is a direction intersecting the main scan direction D1 and is a direction orthogonal to the main scan direction in the present embodiment. The main scan direction D1 corresponds to a subordinate concept of the second direction in the present application. The sub-scan direction D2 corresponds to a subordinate concept of a first direction in the present application.

The medium supply transport unit 300 includes a medium supply unit 310 that mounts the long transfer sheet P wound up in a roll shape on the printing apparatus 100, a medium transport unit 320 that supplies the transfer sheet P pulled out from the medium supply unit 310 to the printing head 410, and a medium delivery unit (not illustrated) that delivers the printed transfer sheet P to the heat transfer unit 500. The medium supply transport unit 300 drives a medium transport roller 321 in response to a control signal from the control unit 200 to transport the transfer sheet P supplied by the medium supply unit 310 from upstream to downstream in the sub-scan direction D2. Although not illustrated, the medium transport unit 320 is provided with sensors such as a sending detection sensor that detects a transport amount of the transfer sheet P and a front end detection sensor that detects a location of a front end of the transfer sheet P. The control unit 200 controls the medium supply transport unit 300 with reference to signals from the sensors.

The carriage movement unit 330 reciprocates the carriage 400 in the main scan direction D1 in response to the control signal from the control unit 200. The carriage movement unit 330 includes a carriage guide shaft 331 and a carriage motor (not illustrated). The carriage guide shaft 331 is disposed in the main scan direction D1, and both ends thereof are fixed to a housing of the printing apparatus 100. The carriage 400 is attached to the carriage guide shaft 331 so as to be capable of reciprocating in the main scan direction D1. If the carriage movement unit 330 drives a carriage motor in response to the control signal from the control unit 200, the carriage 400 reciprocates along the carriage guide shaft 331. Although not illustrated, the carriage movement unit 330 includes a carriage location sensor that detects a location of the carriage 400. The control unit 200 controls a movement amount of the carriage 400 with reference to a signal from the carriage location sensor.

The carriage 400 includes a printing head 410 and an imaging unit 420. The printing head 410 ejects ink droplets onto the transfer sheet P in response to the control signal from the control unit 200 to print an image. In the present embodiment, the printing head 410 ejects inks of four colors which are cyan C, magenta M, yellow Y, and black K. As will be described below with reference to FIG. 2, a plurality of nozzles 92 that eject liquid are provided on a surface of the printing head 410 that faces the transfer sheet P. The printing head 410 ejects ink from each nozzle based on a nozzle usage rate which will be described below. In the present embodiment, the printing apparatus 100 is a so-called off-carriage type printer, and an ink tank is provided at a site different from the carriage 400, and ink is supplied to the printing head 410 from the ink tank via an ink supply path not illustrated.

When the carriage 400 moves in the main scan direction D1 in response to the control signal from the control unit 200, the imaging unit 420 images a printed matter such as a character or an image printed on the transfer sheet P to acquire captured image data. The acquired captured image data is transmitted to the control unit 200. In the present embodiment, the imaging unit 420 is configured by an area sensor that performs two-dimensional imaging. The imaging unit 420 may be configured by a line sensor instead of the area sensor. The imaging unit 420 is disposed on a surface of the carriage 400 that faces the transfer sheet P and is disposed on downstream of the printing head 410 in the sub-scan direction D2 in the carriage 400, as illustrated in FIG. 1. Thereby, when the transfer sheet P is transported to the downstream by the medium transport unit 320, the imaging unit 420 can image an image printed on the transfer sheet P, that is, a dot group formed on the transfer sheet P.

The heat transfer unit 500 performs sublimation transfer of the printed matter such as a character or an image printed on the transfer sheet P to the recording medium F in response to the control signal from the control unit 200. Although not illustrated, the heat transfer unit 500 applies heat and pressure based on a heating temperature and heating time set by the control unit 200 in a state where the transfer sheet P and the recording medium F overlap each other, thereby, transferring the printed matter on the transfer sheet P.

The control unit 200 performs overall control of the printing apparatus 100. The control unit 200 includes an input/output interface 210, a memory 230, and a CPU 220. The CPU 220, the memory 230, and the input/output interface 210 are communicably coupled bidirectionally via an internal bus. The memory 230 includes a ROM, a RAM, and an EEPROM.

The CPU 220 executes a control program previously stored in the memory 230, thereby, functioning as a printing control unit 221, a first density correction value calculation unit 222, a second density correction value calculation unit 223, and a heat transfer control unit 224.

The printing control unit 221 performs processing of generating printing data from image data input from the printing control apparatus 10 and an overall control processing of printing based on the printing data. Specifically, the printing control unit 221 converts a resolution of the image data input from the printing control apparatus 10 into a printing resolution and converts the resolution into image data represented by the gradation values of ink colors C, M, Y, and K. In addition, the printing control unit 221 convers the image data of each ink color into gradation values representing presence or absence of dots of each ink color, that is, two gradation values of a gradation value 255 indicating presence of dots and a gradation value 0 indicating absence of dots. The printing control unit 221 rasterizes the dot data indicating the presence or absence of ink dots on the transfer sheet P for each of the ink colors C, M, Y, and K, and generates printing data including a control command for printing and the dot data. The printing control apparatus 10 may perform the processing, and the printing apparatus 100 may be configured to receive the dot data or the printing data.

The printing control unit 221 generates a signal that drives a nozzle group included in the printing head 410 based on the printing data and transmits the signal to the printing head 410. The printing control unit 221 controls the medium supply unit 310 to control supply of the transfer sheet P. The printing control unit 221 controls the medium transport unit 320 to control transport of the transfer sheet P. In FIG. 1, the transfer sheet P is transported from upstream to downstream in the sub-scan direction D2. The printing control unit 221 also controls the carriage movement unit 330 to cause the carriage 400 to reciprocate. The printing control unit 221 corresponds to a subordinate concept of a halftone data generation unit in the present application.

The first density correction value calculation unit 222 calculates a first density correction value in density correction value determination processing. The second density correction value calculation unit 223 calculates a second density correction value based on a first density correction value 234 in the density correction value determination processing. Detailed description on the density correction value determination processing, the first density correction value 234, and second density correction value 235 will be made below.

The heat transfer control unit 224 controls the heat transfer unit 500 to transfer the transfer sheet P to the recording medium F. The heat transfer control unit 224 determines a heating temperature and heating time when heat transfer is performed.

The input/output interface 210 is coupled to the printing control apparatus 10, the medium supply unit 310, the medium transport unit 320, the carriage movement unit 330, the carriage 400, and the heat transfer unit 500 via control signal lines, respectively. The image data of a printing target which is transmitted from the printing control apparatus 10 is input to the CPU 220 via the input/output interface 210. A drive control signal is output to the medium supply unit 310, the medium transport unit 320, the carriage movement unit 330, the carriage 400, and the heat transfer unit 500 via the input/output interface 210, based on an instruction of the CPU 220.

The memory 230 previously stores an inspection program 231, test pattern data 232, and a nozzle usage rate setting map 233 in addition to a control program for realizing functions of the respective functional units described above. The inspection program 231 is a program for calculating a density correction value for correcting printing density. By executing the inspection program 231, density correction value determination processing which will be described below is performed, and the printing apparatus 100 performs printing of the test pattern data 232 and calculation of the first density correction value 234 and the second density correction value 235 based on the printed test pattern data 232. The calculated first density correction value 234 and second density correction value 235 are stored in the memory 230.

The test pattern data 232 is image data of a test pattern TP which will be described below. The test pattern data 232 is printed on the transfer sheet P in the density correction value determination processing which will be described below and is used to measure a density of dots on the transfer sheet P. A nozzle usage rate for each nozzle is previously set in the nozzle usage rate setting map 233. Detailed description on the test pattern TP and the nozzle usage rate will be described below.

Figure 2:
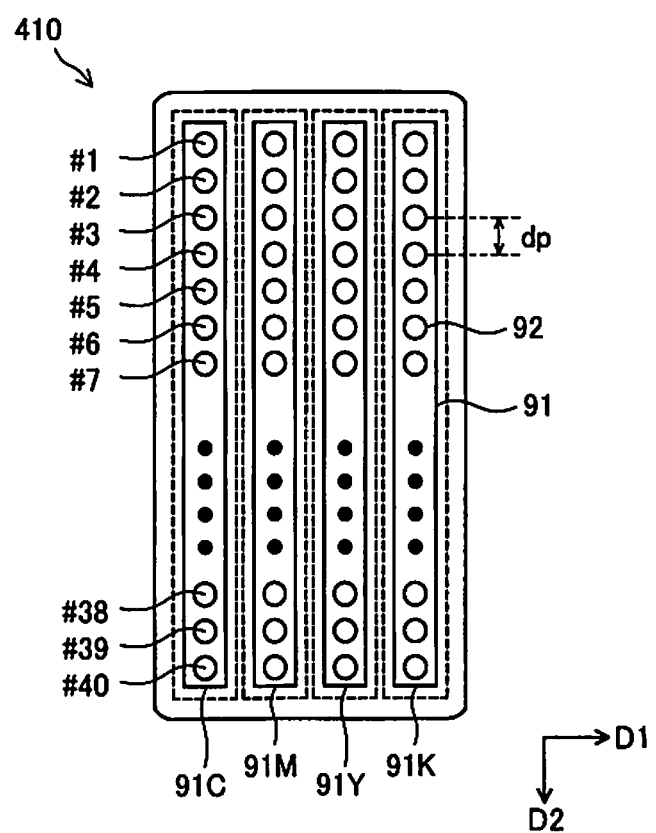
FIG. 2 is an explanatory diagram illustrating a configuration of a nozzle array of a printing head.

A2. Detailed Configuration of Printing Head 410:

FIG. 2 is an explanatory diagram illustrating a configuration of a nozzle array 91 of the printing head 410. FIG. 2 illustrates a configuration of the printing head 410 when viewed in a direction from the transfer sheet P toward the carriage 400. The printing head 410 includes the nozzle array 91 for each ink color. Specifically, the printing head 410 includes a cyan ink nozzle array 91C, a magenta ink nozzle array 91M, a yellow ink nozzle array 91Y, and a black ink nozzle array 91K. Each nozzle array 91 includes a total of 40 nozzles 92 of nozzle numbers #1 to #40, which are arranged at a constant nozzle pitch dp in the sub-scan direction D2. Each nozzle 92 is provided with a piezoelectric element (not illustrated) for driving the nozzle 92 to eject ink. The ink of each ink color is supplied to each nozzle 92 from an ink tank (not illustrated). The cyan ink, the magenta ink, the yellow ink, and the black ink are respectively ejected from each nozzle 92 by driving the piezoelectric element under the control of the printing control unit 221. Various methods such as a thermal method in which a bubble is generated in the nozzle by using a heating element and the ink is ejected by the bubble may be used as a method of ejecting the ink.

It is assumed that, in the nozzle array 91 for one color of the printing head 410, the nozzle pitch dp is equal to a pixel interval on the transfer sheet P. The above-described "pixel" refers to a unit area in which a dot is formed on the transfer sheet P. The nozzle pitch dp may be an integer multiple of the pixel interval on the transfer sheet P. The number of nozzles 92 is not limited to 40 and may be any other number.

Figure 3:
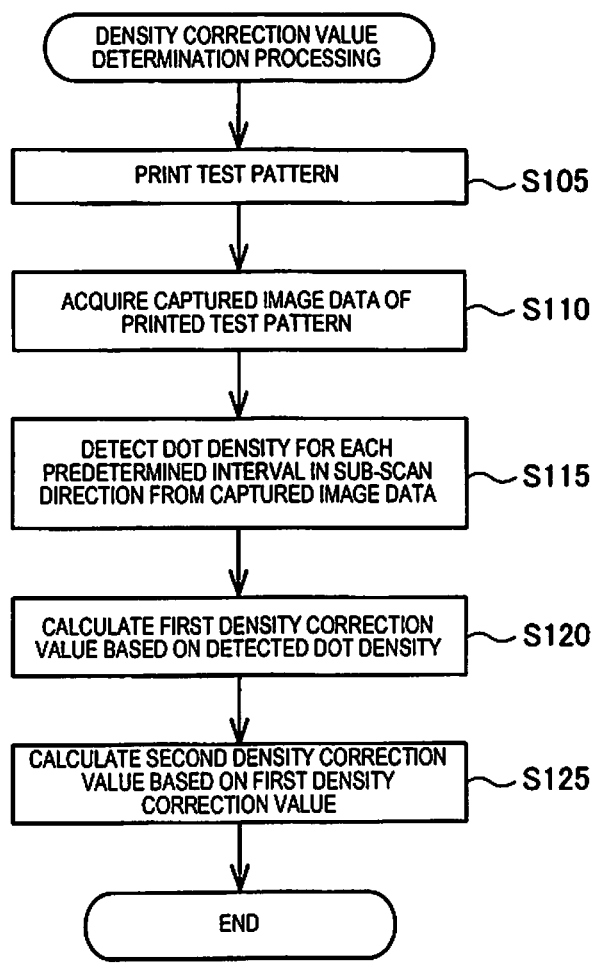
FIG. 3 is a flowchart illustrating a processing sequence of density correction value determination processing.

A3. Correction of Printing Density:

FIG. 3 is a flowchart illustrating a processing sequence of the density correction value determination processing. The density correction value determination processing starts if a user selects an operation menu for performing the density correction value determination processing on a display unit (not illustrated) included in the printing apparatus 100. In step S105, the printing control unit 221 prints the test pattern data 232 on the transfer sheet P. In the present embodiment, the transfer sheet P on which the test pattern data 232 is printed is transfer paper. The test pattern data 232 may be printed on any type of printing medium such as normal paper instead of the transfer paper.

Figure 4:
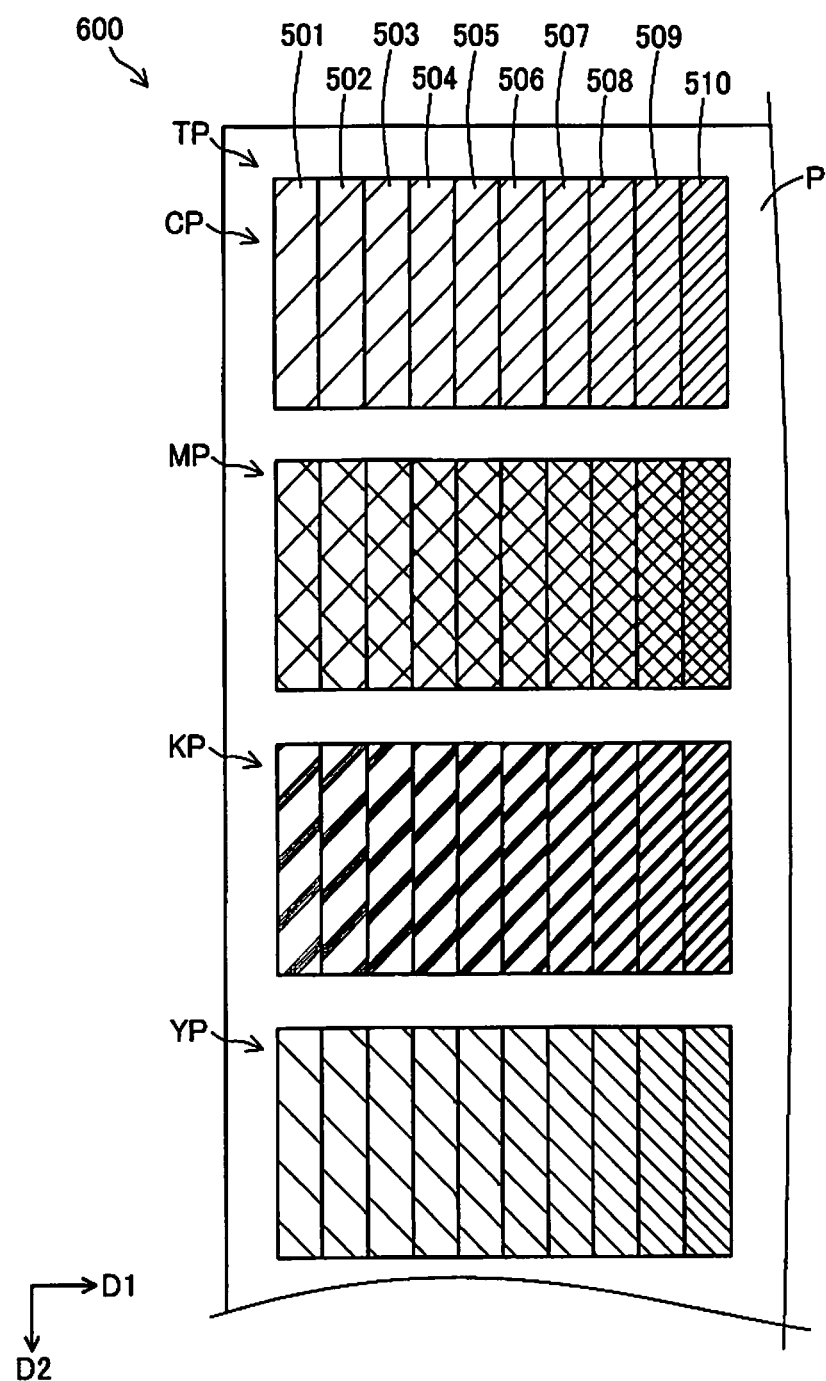
FIG. 4 is an explanatory diagram schematically illustrating a test medium on which a test pattern is printed.

FIG. 4 is an explanatory diagram schematically illustrating a test medium 600 on which the test pattern TP is printed by the printing apparatus 100. The test medium 600 has a configuration in which the test pattern TP is printed on the transfer sheet P. The test pattern TP has pattern arrays CP, MP, KP, and YP at predetermined intervals in the sub-scan direction D2. Each pattern array CP, MP, KP, and YP has test areas 501 to 510 of a substantially rectangular shape in the main scan direction D1. In FIG. 4, although only the test areas 501 to 510 of the pattern array CP are denoted by reference numerals, the same test areas 501 to 510 are provided for the pattern arrays MP, KP, and YP. Each of the test areas 501 to 510 has the same configuration except for printing density. In the present embodiment, each of the test areas 501 to 510 has a betta image printed thereon.

The test patterns TP are printed with different ink colors for each of the pattern arrays CP, MP, KP, and YP. Specifically, each of the test areas 501 to 510 of the pattern array CP is printed as the respective nozzles 92 of the nozzle array 91C eject the cyan ink. The respective test areas 501 to 510 of the pattern array MP are printed as the respective nozzles 92 of the nozzle array 91M eject the magenta ink. The respective test areas 501 to 505 of the pattern array KP are printed as the respective nozzles 92 of the nozzle array 91K eject the black ink. The respective test areas 501 to 505 of the pattern array YP are printed as the respective nozzles 92 of the nozzle array 91Y eject the yellow ink.

As illustrated in FIG. 4, the respective test areas 501 to 510 are printed to change from a low printing density state to a high printing density state from upstream (left side in FIG. 4) toward downstream (right side in FIG. 4) in the main scan direction D1. In other words, the test areas are printed such that an ink duty increases from upstream toward downstream in the main scan direction D1. Specifically, the test area 501 is printed such that the ink duty is 10%. The test areas 502 and 510 are printed such that the ink duty of the test area 502 is 20%, the ink duty of the test area 503 is 30%, the ink duty of the test area 504 is 40%, the ink duty of the test area 505 is 50%, the ink duty of the test area 506 is 60%, the ink duty of the test area 507 is 70%, the ink duty of the test area 508 is 80%, the ink duty of the test area 509 is 90%, and the ink duty of the test area 510 is 100%. The test pattern TP is not limited to the example illustrated in FIG. 4. For example, the pattern arrays CP, MP, KP, and YP may be configured to be arranged at predetermined intervals in the main scan direction D1.

As illustrated in FIG. 3, in step S110, the first density correction value calculation unit 222 controls the imaging unit 420 to acquire the captured image data by imaging the test medium 600 on which the test pattern TP is printed. In step S115, the first density correction value calculation unit 222 detects dot density for each one dot and for each predetermined interval in the sub-scan direction D2 from the captured image data, in the present embodiment. The predetermined interval is not limited to one dot, and any other value may be set as long as the interval does not exceed the number of dots formed in the sub-scan direction D2.

In step S120, the first density correction value calculation unit 222 calculates the first density correction value 234 based on the detected dot density. In the present embodiment, the "first density correction value" means a correction value close to a reference value in which the printing density is predetermined when ink is ejected from each single nozzle 92 of the plurality of nozzles 92 provided in the printing head 410 to form one raster. The "predetermined reference value" means a density value in which the printing density becomes average when the entire printing image is viewed. The reference value is previously calculated by experiment or the like. In the following description, the predetermined reference value may be referred to as a target density value.

Figure 5:
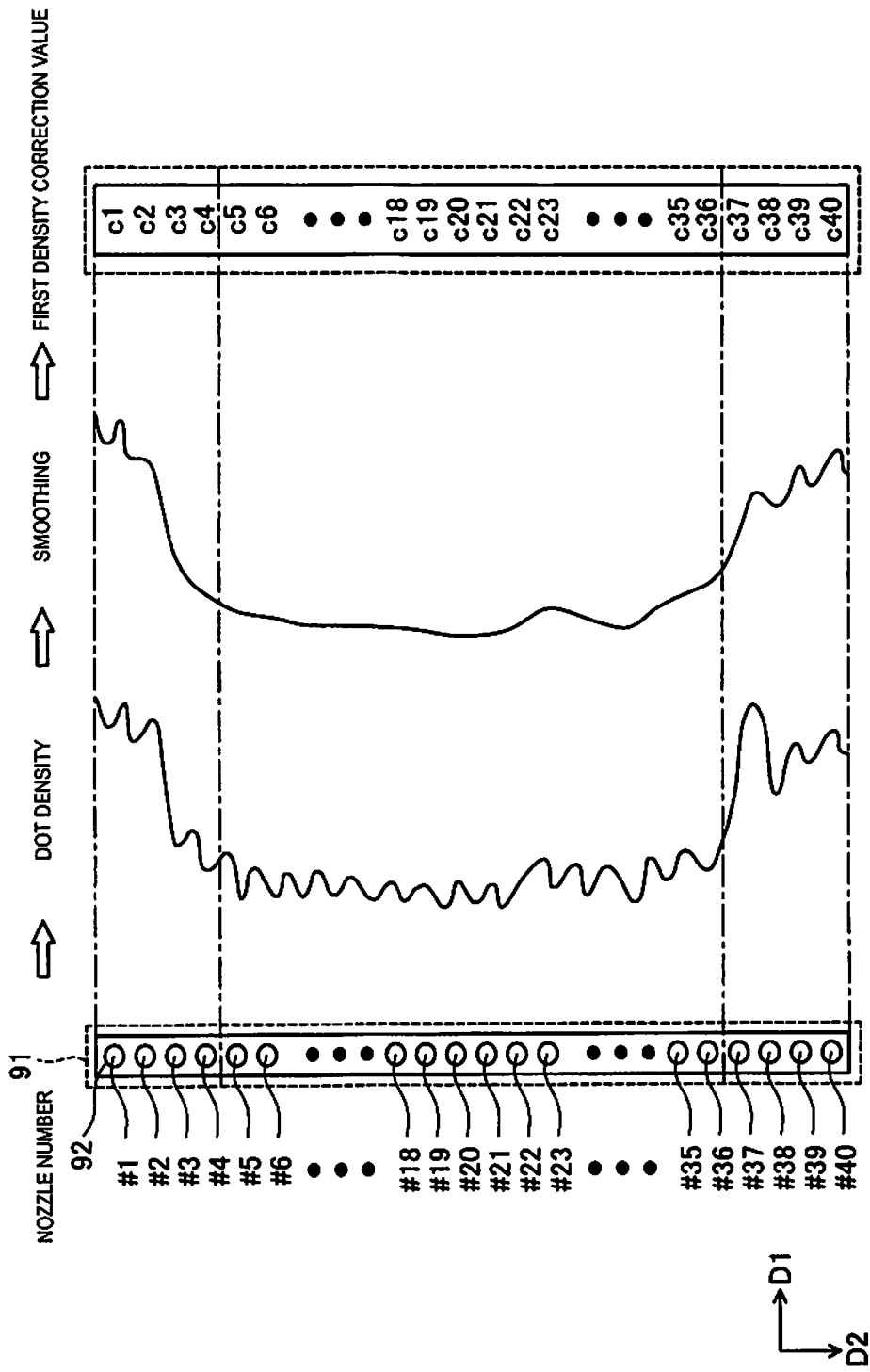
FIG. 5 is an explanatory diagram schematically illustrating a calculation sequence of a first density correction value.

FIG. 5 is an explanatory diagram schematically illustrating a calculation sequence of the first density correction value 234. FIG. 5 illustrates a sequence of step S115 and step S120 described above and illustrates the nozzle array 91 for one color for the sake of convenient illustration. As illustrated in FIG. 5, the first density correction value calculation unit 222 detects the dot density for one dot in the sub-scan direction D2 from the captured image data of the test medium 600 on which the test pattern TP is printed, in the respective nozzle arrays 91C, 91M, 91Y, and 91K. At this time, the first density correction value calculation unit 222 detects the dot density after removing a camera profile from the captured image data.

Next, the first density correction value calculation unit 222 smooths the detected dot density. An end of the nozzle array 91 may not be smoothed because the number of pieces of data is insufficient. The first density correction value calculation unit 222 may omit the smoothing of the dot density. Then, the first density correction value calculation unit 222 obtains the first density correction value 234 in each nozzle 92. Specifically, the first density correction value calculation unit 222 calculates a correction amount cp (p is the nozzle number) of the printing density in which the detected dot density becomes a target density value as the first density correction value 234 using Equation (1).

$$cp = Lavg/Lp \quad (1)$$

wherein Lp is detected dot density (p is the nozzle number) and Lavg is the target density value.

If the calculation of the first density correction value 234 for each nozzle 92 of each of the nozzle arrays 91C, 91M, 91Y, and 91K is completed, the first density correction value calculation unit 222 stores the calculated first density correction value 234 in the memory 230 in association with the nozzle arrays 91C, 91M, 91Y, and 91K and the nozzle numbers.

As illustrated in FIG. 3, in step S125, the second density correction value calculation unit 223 calculates the second density correction value 235 based on the first density correction value 234. In the present embodiment, the "second density correction value" means a correction value close to a reference value in which a printing density is predetermined when different nozzles 92 of the plurality of nozzles 92 included in the printing head 410 are combined to form one raster. Here, a case where the nozzles 92 are combined to form one raster will be described with reference to FIGS. 6 and 7.

Figure 6:
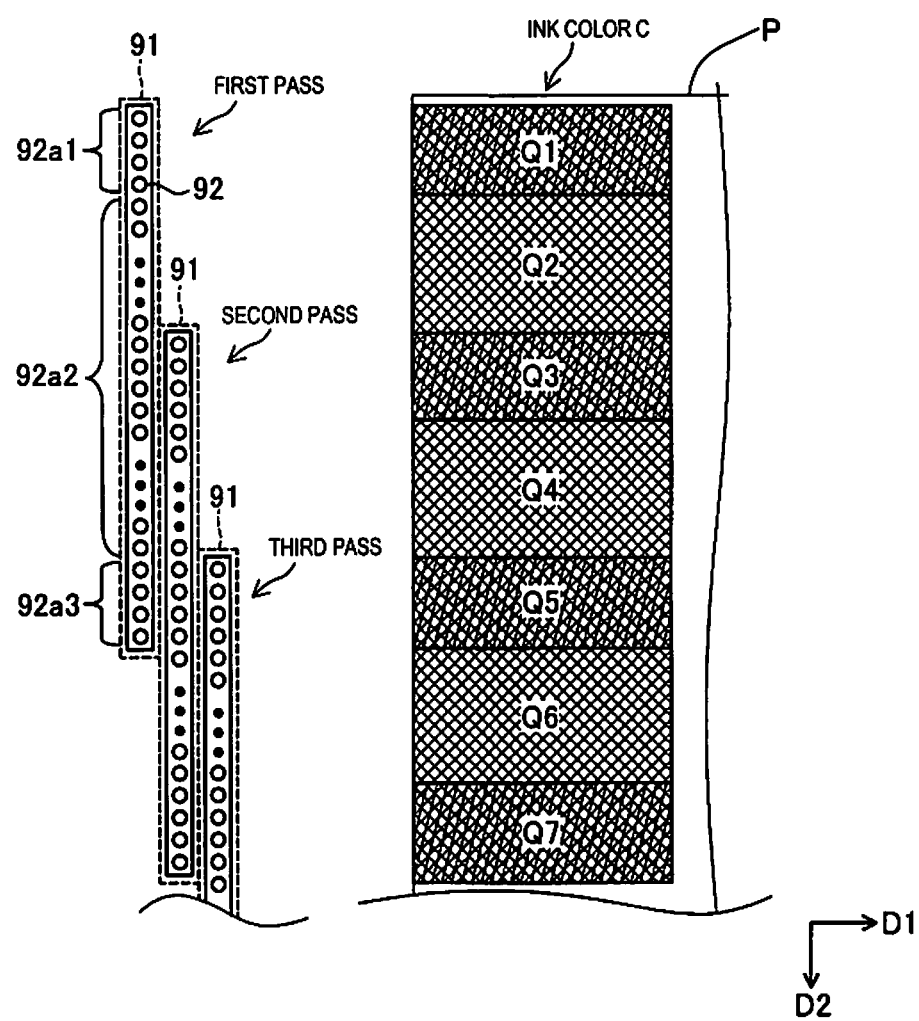
FIG. 6 is an explanatory diagram illustrating a dot formation state.

FIG. 6 is an explanatory diagram illustrating a state in which dots are formed by the printing apparatus 100. FIG. 6 illustrates an example in which the dots are formed on all pixels of the transfer sheet P using ink of one color (ink color C). In the present embodiment, although a pixel interval on the transfer sheet P, that is, the raster pitch and the nozzle pitch dp are equal, an image is formed by interlace printing in which formation of the dots of one raster is completed by moving the printing head 410 a plurality of times in the main scanning direction D1. Specifically, only a part of the dots of one raster is formed in one movement of the printing head 410 in the main scan direction D1, and the formation of the dots of one raster is completed by repeating transport of a predetermined amount of the printing head 410 in the sub scanning direction D2 and formation of the dots according to movement of the printing head 410 in the main scan direction D1 at the location. Therefore, in the example illustrated in FIG. 6, actual printing is not performed in areas Q1 to Q3. In the area Q4 and below, printing processing including printing of the test pattern data 232 is performed.

In the present embodiment, as illustrated in FIG. 2, the number of nozzles 92 for each nozzle array 91 for one color is 40, and movement in the sub scan direction D2 performed after printing is performed once in the main scan direction D1 is 18 dot pitches. Therefore, if the printing head 410 moves once in the sub-scan direction D2, the 22 nozzles 92 overlap a location of the nozzle 92 in the immediately preceding main scan, and if the printing head 410 moves twice in the sub-scan direction D2, the four nozzles 92 overlap a location of the nozzle 92 in the immediately preceding main scan of two times. That is, if the main scan and the sub-scan for 18 dot pitches are repeated, n is set to an integer of 2 or larger, and an image is formed by (A) an area Q(2n) where each raster is formed by the nozzles 92 of nozzle numbers #22 to #36 of the (n−1)st main scan and the nozzle 92 of nozzle numbers #5 to #18 of the nth main scan, and (B) an area Q(2n+1) where each raster is formed by the nozzles 92 of nozzle numbers #37 to #40 of the (n−1)st main scan and the nozzle 92 of nozzle numbers #1 to #4 of the nth main scan. A nozzle usage rate of each nozzle 92 is set as illustrated in FIG. 7 such that dot formation per raster is 100% in any of (A) and (B).

Figure 7:
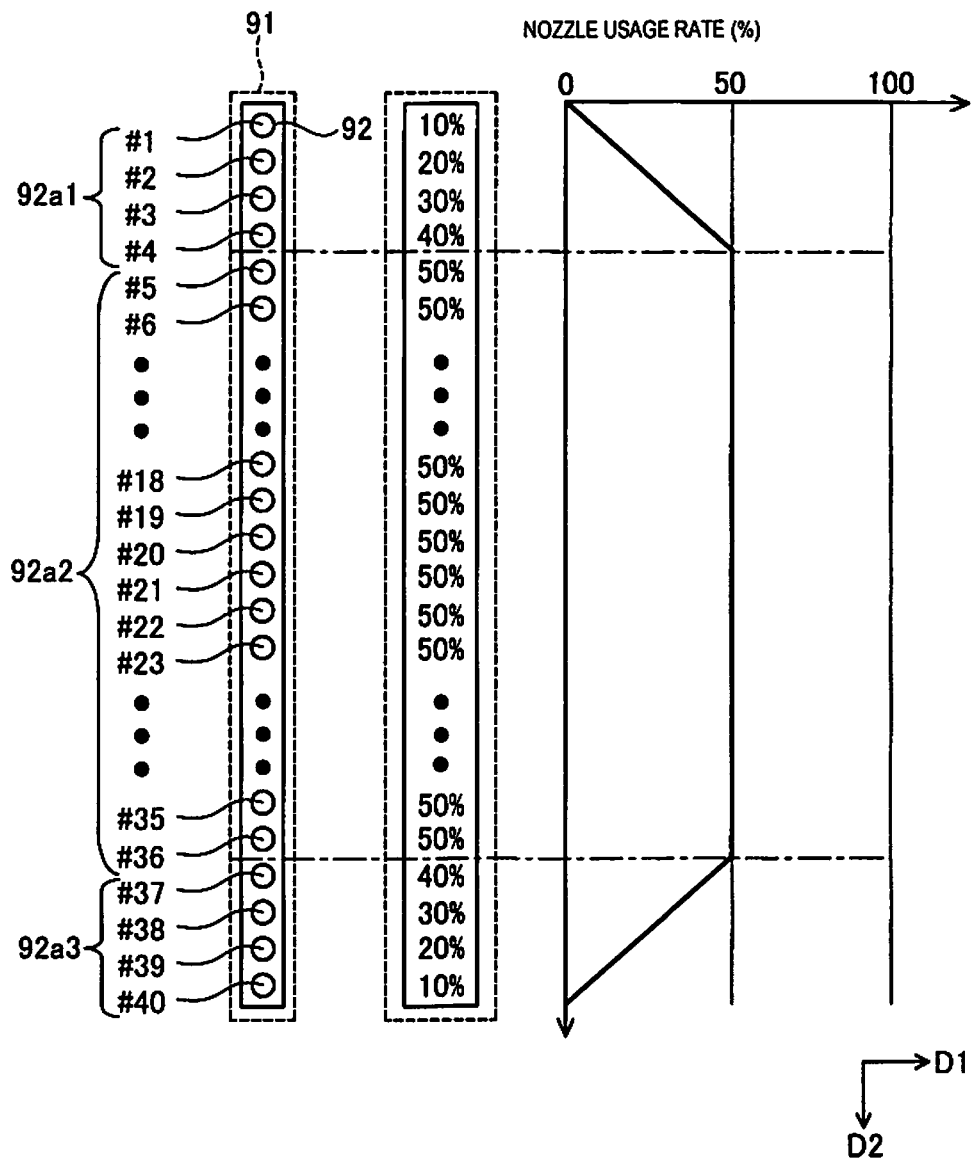
FIG. 7 is an explanatory diagram illustrating a nozzle usage rate.

FIG. 7 is an explanatory diagram illustrating the nozzle usage rate of the nozzle array 91. The "nozzle usage rate"

means a ratio of the number of dots formed by the nozzles 92 in one main scan to the total number of dots in the main scan direction D1. In the printing apparatus 100, when the ink is ejected onto the transfer sheet P, the ink is ejected from the nozzles 92 based on the nozzle usage rate illustrated in FIG. 7. The nozzle usage rate is previously set in the above-described nozzle usage rate setting map 233.

As illustrated in FIG. 7, among nozzles 92a1 in an upper end portion, a nozzle usage rate of the nozzle 92 of a nozzle number #1, which is located on the most upstream in the sub-scan direction D2, is set to 10%. Nozzle usage rates of the other nozzles 92 among the nozzles 92a1 in the upper end portion are set to gradually increase from upstream toward downstream in the sub-scan direction D2, a nozzle usage rate of the nozzle 92 of a nozzle number #2 is set to 20%, a nozzle usage rate of the nozzle 92 of a nozzle number #3 is set to 30%, and a nozzle usage rate of the nozzle 92 of a nozzle number #4 is set to 40%, respectively.

Among nozzles 92a2 in a central portion, nozzle usage rates of the respective nozzles 92 of nozzle numbers #5 to #36 are set to 50%. Among nozzles 92a3 in a lower end portion, nozzle usage rates of the respective nozzles 92 are set to be gradually reduced from upstream toward downstream in the sub-scan direction D2. The nozzle usage rate of the nozzle 92 of a nozzle number #37 is set to 40%, the nozzle usage rate of the nozzle 92 of a nozzle number #38 is set to 30%, the nozzle usage rate of the nozzle 92 of a nozzle number #39 is set to 20%, and the nozzle usage rate of the nozzle 92 of a nozzle number #40 is set to 10%, respectively.

Although FIG. 6 illustrates an example in which dots are formed on all the pixels of the transfer sheet P using one color ink, the same applies to each ink color. That is, the printing apparatus 100 forms dots by respectively combining various nozzles 92 among the plurality of nozzles 92 of the respective nozzle arrays 91C, 91M, 91Y, and 91K based on the nozzle usage rates. Therefore, it can be said that the printing apparatus 100 has multiple printing modes according to the nozzle usage rates and the combination of the nozzles 92.

Here, the description returns to step S125 in the density correction value determination processing illustrated in FIG. 3. As described above, the second density correction value calculation unit 223 calculates the second density correction value 235 based on the first density correction value 234. In step S125, the second density correction value calculation unit 223 calculates a predetermined calculation result of the first density correction value 234 and the above-described nozzle usage rates as the second density correction value 235. Hereinafter, detailed description will be made with reference to FIG. 8.

Figure 8:
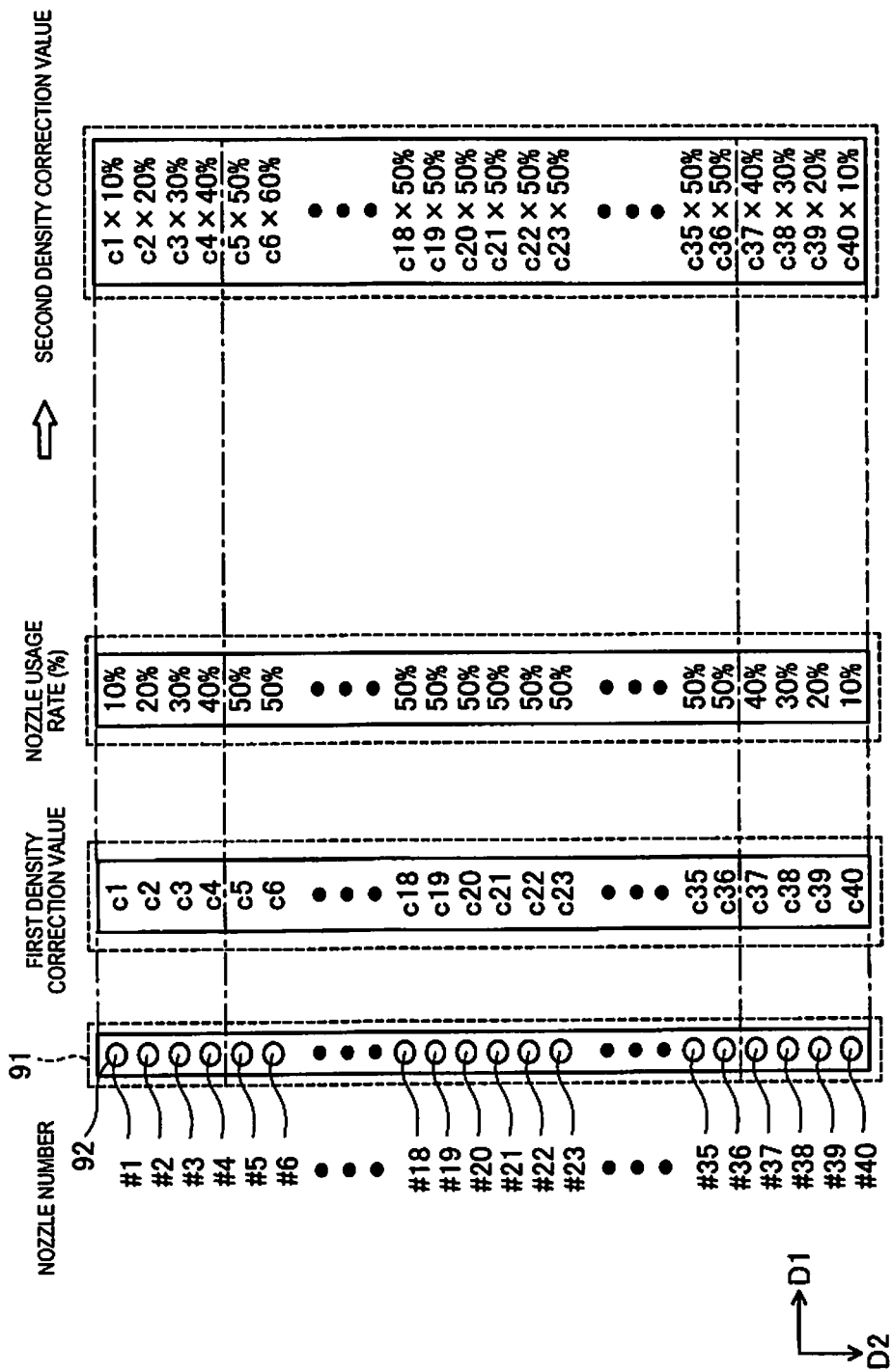
FIG. 8 is an explanatory diagram schematically illustrating a calculation sequence of a second density correction value.

FIG. 8 is an explanatory diagram schematically illustrating a calculation sequence of the second density correction value 235. As illustrated in FIG. 8, the second density correction value 235 is obtained by calculating a product of the first density correction value 234 and the nozzle usage rate. Specifically, the second density correction value 235 corresponding to the nozzle 92 of nozzle number #1 can be obtained by calculating a product of a correction value c1 which is the first density correction value 234 of the nozzle 92 of the nozzle number #1 and 10% which is the nozzle usage rate of the nozzle 92 of the nozzle number #1. Likewise, the second density correction value 235 corresponding to the nozzle 92 of the nozzle number #2 can be obtained by calculating a product of a correction value c2 which is the first density correction value 234 of the nozzle 92 of the nozzle number #1 and 20% which is the nozzle usage rate of the nozzle 92 of the nozzle number #2. As illustrated in FIG. 8, the same applies to the second density correction value 235 of each of the nozzles 92 of the nozzle numbers #3 to #40.

Here, as described above, since the second density correction value 235 is a correction amount of the printing density set when the different nozzles 92 of the plurality of nozzles 92 are combined to form one raster, in fact, the second density correction value 235 may be obtained by calculating the product of the first density correction value 234 and the nozzle usage rate for each nozzle 92, and a sum of the second density correction values 235 of the nozzles 92 corresponding to each main scan pass may be calculated.

As such, in the above-described step S125 illustrated in FIG. 3, the second density correction value 235 is calculated by using the first density correction value 234 of each nozzle 92 and the nozzle usage rate of each nozzle 92 in association with the combination of the respective nozzles 92 forming the dots of each raster. Accordingly, the second density correction value 235 can be obtained by omitting the printing of the test pattern data 232 and the detection of the dot density of the printed test pattern TP for each combination of the nozzles 92 of each raster, that is, for each printing mode. Therefore, it is possible to reduce the time for calculating the density correction values as compared with a configuration in which the density correction values are calculated for each of the multiple printing modes.

In step S125, if the calculation of the second density correction value 235 for the respective nozzles 92 of the respective nozzle arrays 91C, 91M, 91Y, and 91K is completed, the second density correction value calculation unit 223 stores the calculated second density correction value 235 in the memory 230 in association with the nozzle arrays 91C, 91M, 91Y, 91K and the nozzle numbers.

After step S125 is performed, the density correction value determination processing ends. Thereafter, the printing apparatus 100 in a state in which the first density correction value 234 and the second density correction value 235 are stored in the memory 230 is shipped, and normal printing is performed by using the second density correction value 235.

Figure 9:
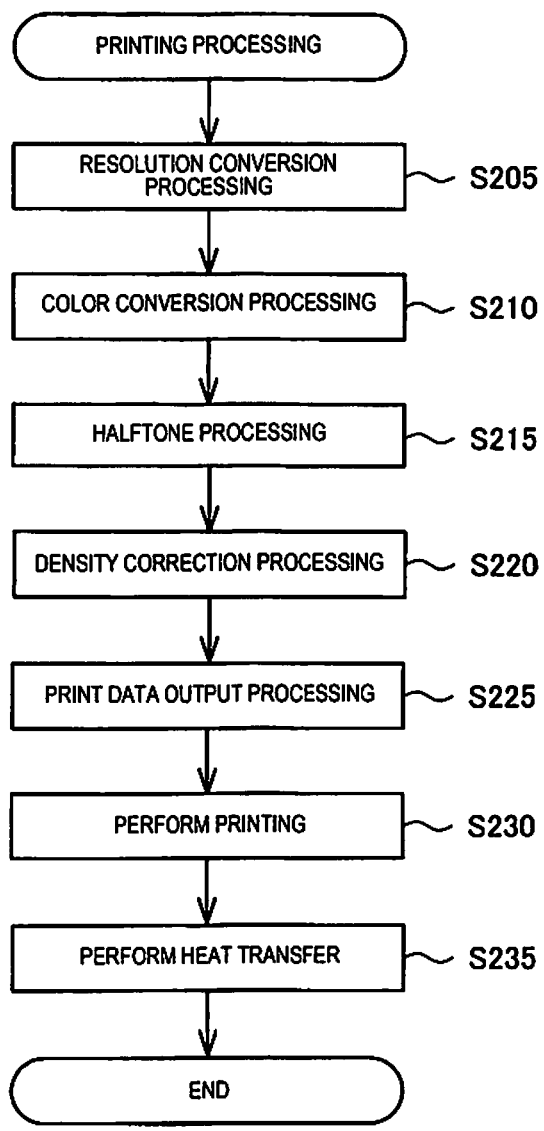
FIG. 9 is a flowchart illustrating a processing sequence of printing processing.

A4. Printing Processing:

FIG. 9 is a flowchart illustrating a processing sequence of printing processing. The processing sequence of the printing processing illustrated in FIG. 9 is a normal printing sequence performed by using the second density correction value 235 obtained by the above-described density correction value determination processing. As illustrated in FIG. 9, if a user designates image data in the printing control apparatus 10 and issues a printing instruction, the printing processing starts. In step S205, the printing control unit 221 performs resolution conversion processing on the designated image data. Image data which becomes a processing target corresponds to the image data generated by the application in the printing control apparatus 10 and is image data having gradation values of 0 to 255 configured with red, green and blue color components. In step S205, the printing control unit 221 converts a resolution of the image data into a resolution when printing on the transfer sheet P.

In step S210, the printing control unit 221 performs color conversion processing. Specifically, the printing control unit 221 converts RGB data into CMYK data of 256 gradations represented by a color space of the ink color CMYK of the printing apparatus 100 with reference to a color conversion table (not illustrated).

In step S215, the printing control unit 221 performs halftone processing. Specifically, the printing control unit 221 converts the 256 gradation values of the CMYK data into four gradation values that can be represented by the printing apparatus 100 using a dither matrix (not illustrated). Specifically, data of 256 gradations is converted into 1-bit data illustrating two gradations or 2-bit data illustrating four gradations. At this time, the printing control unit 221 determines which main scan pass of the main scan passes forms each dot in the main scan direction D1 for the halftone data.

In step S220, the printing control unit 221 performs density correction processing. Specifically, the printing control unit 221 acquires the second density correction value 235 with reference to the memory 230 and corrects the printing density of each dot by applying the second density correction value 235 to the halftone data obtained in step S125 described above. The density correction is performed by adjusting an ejection amount of the ink from each nozzle 92. When the density decreases, the ejection amount of the ink is reduced, and when the density increases, the ejection amount of the ink is increased.

In step S225, the printing control unit 221 performs printing data output processing. Specifically, the printing control unit 221 performs rasterization processing using the halftone data to which the second density correction value 235 is applied, and outputs the printing data after processing.

In step S230, the printing control unit 221 performs printing on the transfer sheet P by controlling the medium supply unit 310, the medium transport unit 320, the carriage movement unit 330, and the carriage 400 based on the printing data. At this time, since the second density correction value 235 is applied to the printing data generated in step S225 described above and density correction is performed, unevenness of printing density in the image printed based on the printing data is reduced.

In step S235, the heat transfer control unit 224 controls the heat transfer unit 500 transfers the printed matter on the transfer sheet P onto the recording medium F by overlapping the transfer sheet P and the recording medium F and applying heat and pressure thereto. As described above, the second density correction value 235 of the present embodiment, which is a density correction value based on the nozzle usage rate for each nozzle 92, in other words, a weight of the ink droplet for each nozzle 92, is calculated. Accordingly, the printed matter is transferred with an appropriate ink amount on the recording medium F on which the image printed based on the printing data to which the second density correction value 235 is applied is transferred.

According to the printing apparatus 100 of the present embodiment described above, the first density correction value 234 is calculated based on a density of the captured image data of the printed test pattern TP, the second density correction value 235 is calculated based on the calculated first density correction value 234, and thereby, it is possible to reduce time to calculate a density correction value as compared with a configuration in which a density correction value set when different nozzles 92 are combined to form one raster is calculated for each combination of the nozzles 92. Since a printing target image is printed by using the calculated second density correction value 235, it is possible to suppress generation of unevenness of printing density in the printing image and to suppress deterioration in printing image quality.

B. Second Embodiment

B1. Configuration of Apparatus:

A printing apparatus 100 according to a second embodiment differs from the printing apparatus 100 according to the first embodiment in that a printing head 410a is provided instead of the printing head 410. The other configuration of the printing apparatus 100 is the same as the configuration of the first embodiment, and thus detailed description thereon is omitted.

Figure 10:
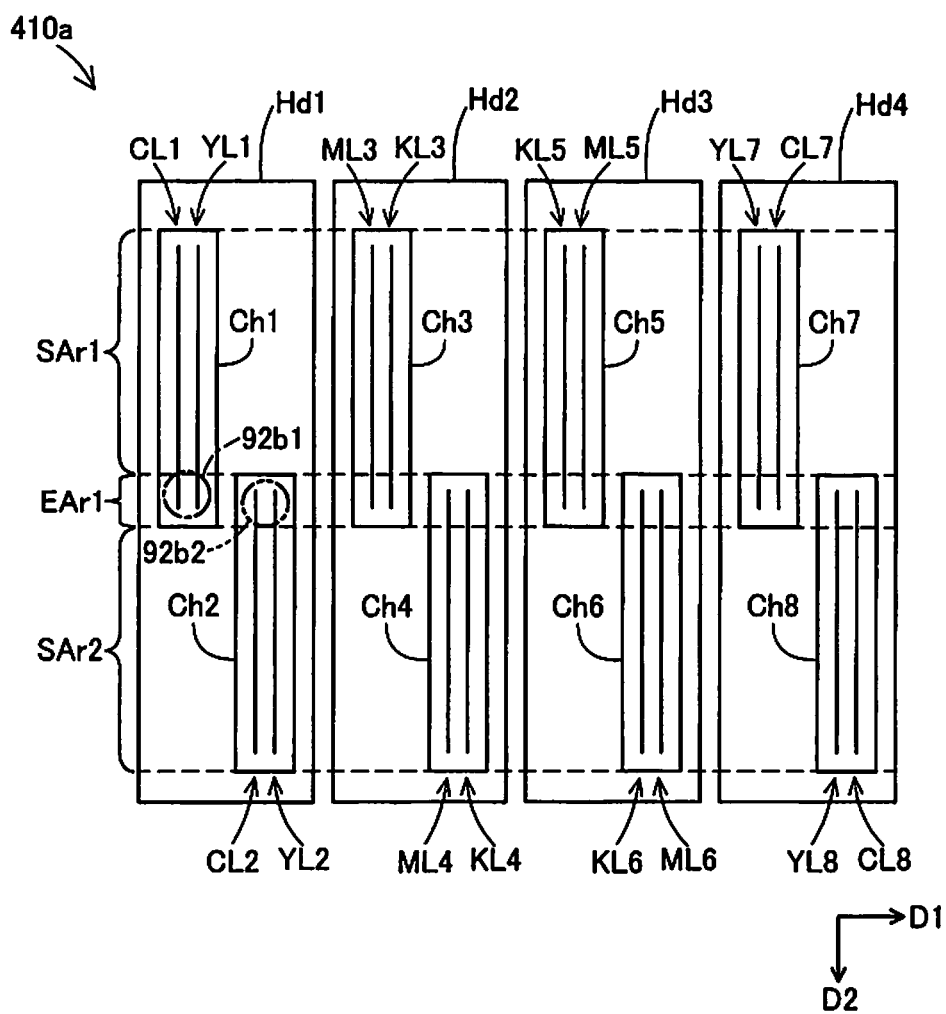
FIG. 10 is an explanatory diagram illustrating a detailed configuration of a printing head according to a second embodiment.

FIG. 10 is an explanatory diagram illustrating a detailed configuration of the printing head 410a. The printing head 410a is configured by a total of four printing heads, each including two printing chips, each having a plurality of nozzles 92 that eject ink of each ink color. FIG. 10 illustrates the configuration of the printing head 410a when viewed from the transfer sheet P to a direction toward the carriage 400, as illustrated in FIG. 2.

The printing head 410a includes a first printing head Hd1, a second printing head Hd2, a third printing head Hd3, and a fourth printing head Hd4. Each of the printing heads Hd1 to Hd4 includes two printing chips. The two printing chips included in each of the printing heads Hd1 to Hd4 are disposed in the same manner at the same locations in each of the printing heads Hd1 to Hd4. Specifically, the two printing chips in each of the printing heads Hd1 to Hd4 are disposed so as to partially overlap each other when viewed in the main scan direction D1.

The first printing head Hd1 includes a first printing chip Ch1 and a second printing chip Ch2. The second printing head Hd2 includes a third printing chip Ch3 and a fourth printing chip Ch4. The third printing head Hd3 includes a fifth printing chip Ch5 and a sixth printing chip Ch6. The fourth printing head Hd4 includes a seventh printing chip Ch7 and an eighth printing chip Ch8. Each of the printing chips Ch1 to Ch8 is a printing chip in which an ink ejection mechanism such as a piezo element, an ink chamber, or a nozzle is chipped by applying a semiconductor processing technology.

The first printing chip Ch1 includes two nozzle arrays which eject ink having different colors from each other. Specifically, the first printing chip Ch1 includes a first nozzle array CL1 including the plurality of nozzles 92 that eject cyan ink, and a second nozzle array YL1 including the plurality of nozzles 92 that eject yellow ink. Likewise, the second printing chip Ch2 includes a third nozzle array CL2 including the plurality of nozzles 92 that eject cyan ink, and a fourth nozzle array YL2 including the plurality of nozzles 92 that eject yellow ink. As such, the two printing chips Ch1 and Ch2 include the same two nozzle arrays in which a combination of the ink colors to be ejected is the same.

Likewise, the third printing chip Ch3 includes a fifth nozzle array ML3 including the plurality of nozzles 92 that eject magenta ink, and a sixth nozzle array KL3 including the plurality of nozzles 92 that eject black ink. The fourth printing chip Ch4 includes a seventh nozzle array ML4 including the plurality of nozzles 92 that eject magenta ink, and an eighth nozzle array KL4 including the plurality of nozzles 92 that eject black ink.

The fifth printing chip Ch5 includes a ninth nozzle array KL5 including the plurality of nozzles 92 that eject black ink, and a tenth nozzle array ML5 including the plurality of nozzles 92 that eject magenta ink. The sixth printing chip Ch6 includes an 11th nozzle array KL6 including the plurality of nozzles 92 that eject black ink, and a 12th nozzle array ML6 including the plurality of nozzles 92 that eject magenta ink.

The seventh printing chip Ch7 includes a 13th nozzle array YL7 including the plurality of nozzles 92 that eject yellow ink, and a 14th nozzle array CL7 including the plurality of nozzles 92 that eject cyan ink. The eighth printing chip Ch8 includes the 15th nozzle array YL8 including the plurality of nozzles 92 that eject yellow ink, and a 16th nozzle array CL8 including the plurality of nozzles 92 that eject cyan ink.

The two nozzle arrays in each of the printing chips Ch1 to Ch8 are disposed to be spaced apart from each other in the main scan direction D1. Specifically, the first nozzle array CL1 and the second nozzle array YL1 are disposed to be spaced apart from each other in the main scan direction D1. Likewise, the third nozzle array CL2 and the fourth nozzle array YL2 are disposed to be spaced apart from each other in the main scan direction D1. The fifth nozzle array ML3 and the sixth nozzle array KL3 are disposed to be spaced apart from each other in the main scan direction D1. The seventh nozzle array ML4 and the eighth nozzle array KL4 are disposed to be spaced apart from each other in the main scan direction D1. The ninth nozzle array KL5 and the tenth nozzle array ML5 are disposed to be spaced apart from each other in the main scan direction D1. The 11th nozzle array KL6 and the 12th nozzle array ML6 are disposed to be spaced apart from each other in the main scan direction D1. The 13th nozzle array YL7 and the 14th nozzle array CL7 are disposed to be spaced apart from each other in the main scan direction D1. The 15th nozzle array YL8 and the 16th nozzle array CL8 are disposed to be spaced apart from each other in the main scan direction D1.

In each of the printing chips Ch1 to Ch8, a signal for driving the nozzle group is supplied from the printing control unit 221, and ink is ejected from each nozzle array in response to the signal.

As described above, the two printing chips in each of the printing heads Hd1 to Hd4 are disposed so as to partially overlap when viewed in the main scan direction D1. As illustrated in FIG. 10, the two printing chips in each of the printing heads Hd1 to Hd4 are disposed to become an area (hereinafter, "non-overlapping area") SAr1 which does not overlap when the two printing chips are viewed in the main scan direction D1 from upstream of the sub scan direction D2, an area (hereinafter, referred to as an "overlapping area") EAr1 which overlaps when the two printing chips are viewed in the main scan direction D1, and a non-overlapping area SAr2.

In the overlapping area EAr1 of the first printing head Hd1, among the plurality of nozzles 92 included in the printing head 410a, a partial nozzle group 92b1 of the first nozzle array CL1 and the second nozzle array YL1 overlaps another partial nozzle group 92b2 of the third nozzle array CL2 and the fourth nozzle array YL2. Likewise, in the printing heads Hd2 to Hd4, a partial nozzle group of one of the printing chips Ch3, Ch5, and Ch7 overlaps a partial nozzle group of the other one of the printing chips Ch4, Ch6, and Ch8, respectively.

In the present embodiment, in the non-overlapping areas SAr1 and SAr2, one raster is formed by using a single printing chip, and in the overlapping area EAr1, one raster is formed by combining the nozzles 92 of the two printing chips. Specifically, in the non-overlapping area SAr1 in the first printing head Hd1, ink is ejected from the respective nozzles 92 of the nozzle arrays CL1 and YL1 of the first printing chip Ch1 to form one raster. In the non-overlapping area SAr2, ink is ejected from the respective nozzles 92 of the nozzle arrays CL2 and YL2 of the second printing chip Ch2 to form one raster. The nozzle usage rates of the respective nozzle 92 of each of the nozzle arrays CL1, CL2, YL1, and YL2 in the non-overlapping areas SAr1 and SAr2 are set to 100%.

Meanwhile, in the overlapping area EAr1, ink is ejected by combining different nozzles 92 among the respective nozzles 92 of the nozzle group 92b1 of the first printing chip Ch1, the nozzle group 92b2 of the second printing chip Ch2 to form one raster. The nozzle usage rates of the respective nozzles 92 of the respective nozzle arrays CL1, CL2, YL1, and YL2 in the overlapping area EAr1 are set to 50%. That is, in the overlapping area EAr1, there are many printing modes corresponding to the combination of the respective nozzles 92 and the nozzle usage rates of the respective nozzles 92. The raster is formed based on the same nozzle usage rate as the first printing head Hd1 even in the non-overlapping areas SAr1, SAr2, and the overlapping area EAr1 of the second printing head Hd2, the third printing head Hd3, and the fourth printing head Hd4.

A processing sequence of density correction value determination processing according to a second embodiment is the same as the processing sequence of the density correction value determination processing according to the first embodiment illustrated in FIG. 3, but in the second embodiment, the second density correction value 235 of the overlapping area EAr1 is calculated based on the first density correction value 234 of the non-overlapping areas SAr1 and SAr2. A specific description will be made below.

Figure 11:
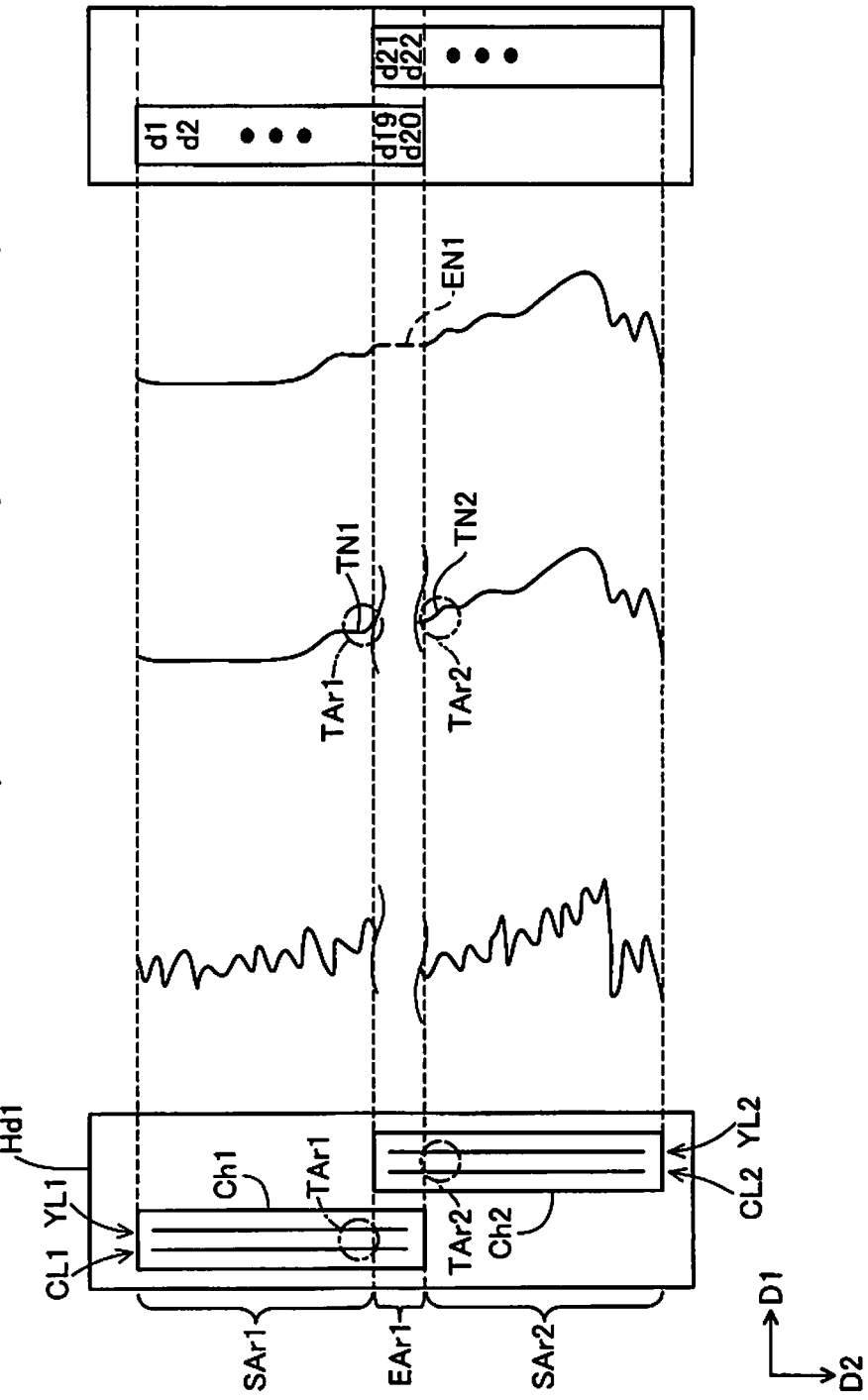
FIG. 11 is an explanatory diagram schematically illustrating a calculation sequence of a first density correction value in the second embodiment.

FIG. 11 is an explanatory diagram schematically illustrating a calculation sequence of the first density correction value 234 according to the second embodiment. FIG. 11 illustrates the first printing head Hd1 of the printing head 410a illustrated in FIG. 10. In the first printing head Hd1, an area TAr1 is an area in the non-overlapping area SAr1 and at an end portion on a boundary side with the overlapping area EAr1 in the non-overlapping area SAr1. An area TAr2 is an area in the non-overlapping area Sar2 and at an end portion on a boundary side with the overlapping area EAr1 in the non-overlapping area Sar2. In the following description, the areas TAr1 and TAr2 are referred to as end portion areas TAr1 and TAr2, respectively.

As in the first embodiment, if the test pattern data 232 is printed and the dot density is detected from the captured image data of the printed test pattern TP in step S105 to step S115 illustrated in FIG. 3, the first density correction value calculation unit 222 smooths each detected dot density. A dot density TN1 illustrated in FIG. 11 is a dot density of the end portion area TAr1. A dot density TN2 is a dot density of the end portion area TAr2.

Next, in the smoothed dot density, the first density correction value calculation unit 222 complements the dot density of the overlapping area EAr1 with the dot densities TN1 and TN2 of the end portion areas TAr1 and TAr2. Specifically, the first density correction value calculation unit 222 interpolates linearly a dot density of a location closest to the boundary of the overlapping area EAr1 in the dot density TN1 and a dot density closest to the boundary of the overlapping area EAr1 in the dot density TN2, thereby, calculating a dot density EN1 of the overlapping area EAr1. Thereafter, the first density correction value 234 is calculated based on each dot density in the same sequence as in the first embodiment. In FIG. 11, the calculated first density correction values 234 are numbered sequentially from 1 from upstream toward downstream of the sub-scan direction D2 to a sign of a correction value d for the sake of convenient illustration.

Then, the above-described step S125 is performed, and the second density correction value calculation unit 223 calculates the second density correction value 235 based on the first density correction value 234. In other words, the second density correction value 235 in the overlapping area EAr1 is calculated based on the first density correction value 234 of the end portion area TAr1 of the non-overlapping area SAr1, and the first density correction value 234 of the end portion area TAr2 of the non-overlapping area SAr2.

Since the processing sequence of the printing processing according to the second embodiment is the same as the processing sequence of the printing processing according to the first embodiment illustrated in FIG. 9, the detailed description thereof is omitted.

According to the printing apparatus 100 of the second embodiment described above, the same effect as the effect of the first embodiment is obtained. In addition to this, since the second density correction value 235 of the overlapping area EAr1 which is an area where the first printing chip Ch1 and the second printing chip Ch2 overlap when viewed in the sub-scan direction D2 is calculated based on the first density correction value 234 of the non-overlapping areas SAr1 and SAr2, the second density correction value 235 of the overlapping area EAr1 can be accurately calculated, and the deterioration of the image quality of the printing image can be suppressed. Since the second density correction value 235 of the overlapping area EAr1 is calculated based on the first density correction values 234 of the end portion areas TAr1 and TAr2, the second density correction value 235 of the overlapping area EAr1 can be calculated more accurately.

C. Third Embodiment

A printing apparatus 100 according to a third embodiment is the same as the printing apparatus 100 according to the first embodiment, and thus, detailed description thereof is omitted. Since a printing head 410a according to the third embodiment is the same as the printing head 410a according to the second embodiment, detailed description thereof is omitted. A processing sequence of density correction value determination processing according to the third embodiment is the same as the processing sequence of the density correction value determination processing according to the first embodiment illustrated in FIG. 3, and thus, detailed description thereof is omitted.

Figure 12:
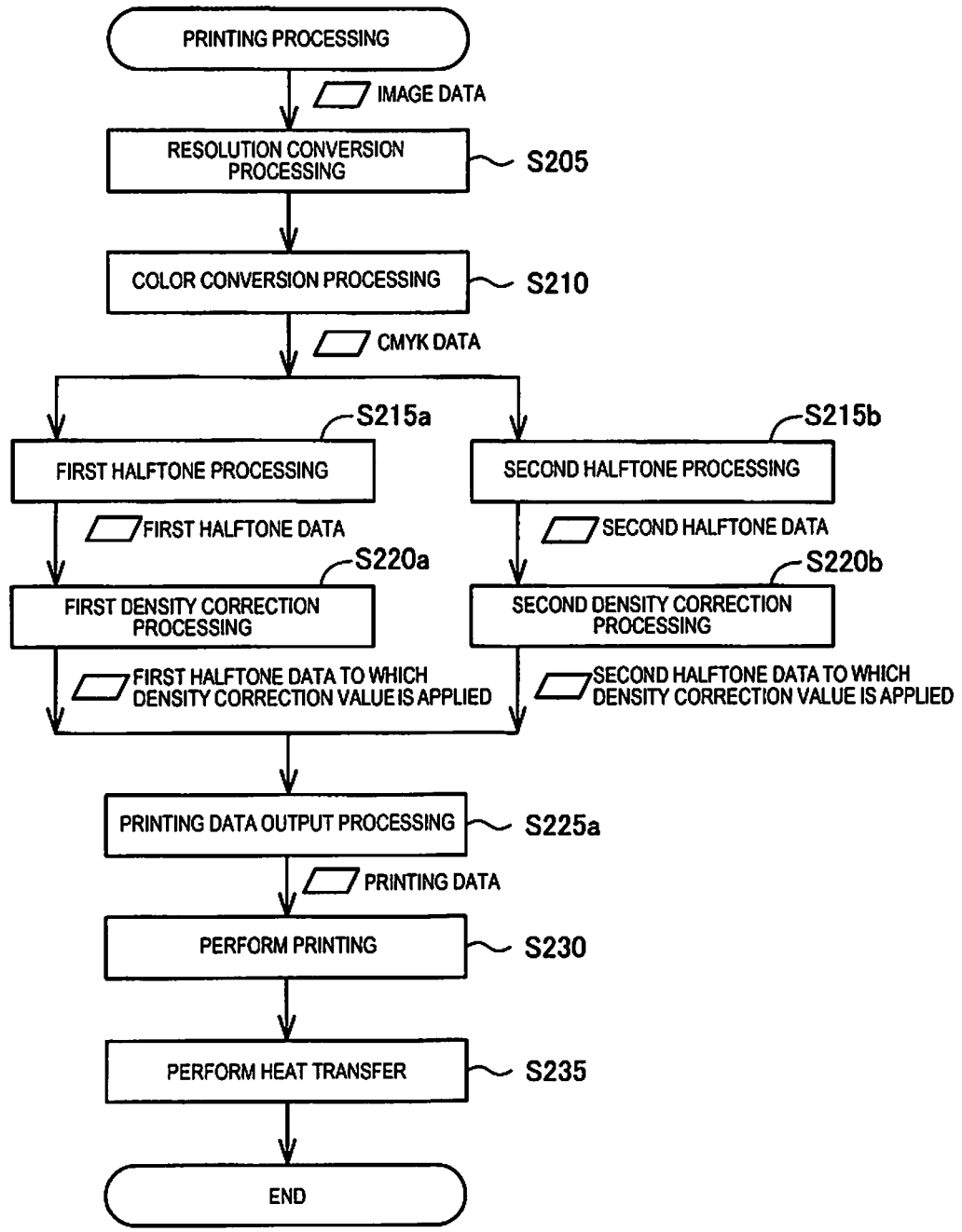
FIG. 12 is a flowchart illustrating a processing sequence of printing processing according to a third embodiment.

FIG. 12 is a flowchart illustrating a processing sequence of printing processing according to the third embodiment. The printing processing according to the third embodiment differs from the printing processing according to the first embodiment illustrated in FIG. 9 in that step S215a and step S215b are performed instead of step S215, step S220a and step S220b are performed instead of step S220, and step S225a is performed instead of step S225. The other sequences of the printing processing according to the third embodiment are the same as the sequences of the printing processing according to the first embodiment, and thus, the same sequences are denoted by the same reference numerals and detailed description thereof is omitted.

In the printing processing according to the third embodiment, halftone processing and density correction processing for the same area of the CMYK data of which color conversion is completed are performed a plurality of times to generate a plurality of pieces of halftone data to which the density correction value is applied. Then, printing data is generated by allocating the plurality of pieces of generated halftone data to the respective main scan paths. Details will be described below.

As illustrated in FIG. 12, if step S210 described above is performed to convert RGB image data to CMYK data, the printing control unit 221 performs the halftone processing for the CMYK data in steps S215a and S215b. Specifically, the printing control unit 221 performs first halftone processing for a predetermined area of the CMYK data to generate the first halftone data. In addition, the printing control unit 221 performs second halftone processing for the same area as the area in which the first halftone processing is performed on the CMYK data to generate second halftone data.

In the present embodiment, the "predetermined area" described above means the overlapping area EAr1. In step S215a, the printing control unit 221 performs the first halftone processing for the CMYK data of the area where the respective nozzle arrays CL1 and YL1 of the first printing chip Ch1 in the overlapping area EAr1 form dots. In step S215b, the printing control unit 221 performs the second halftone processing for the CMYK data of the area where the respective nozzle arrays CL2 and YL2 of the second printing chip Ch2 in the overlapping area EAr1 form dots. Since the first halftoning processing and the second halftone processing are the same as the processing contents of the halftone processing according to the first embodiment, detailed description thereof is omitted. A dither mask used for the halftone may be different in the first halftone processing and the second halftone processing.

In steps S220a and S220b, the printing control unit 221 performs density correction processing for the halftone data. Specifically, the printing control unit 221 performs the first density correction processing for the first halftone data to generate first halftone data to which the density correction value is applied. In addition, the printing control unit 221 performs second density correction processing for the second halftone data to generate second halftone data to which the density correction value is applied. The first density correction processing and the second density correction processing are the same as processing contents of the density correction processing according to the first embodiment. That is, the second density correction value 235 is applied to each halftone data.

In step S225a, the printing control unit 221 performs printing data output processing. Specifically, the printing control unit 221 merges each halftone data to which the density correction value is applied, performs rasterization processing based on the merged halftone data, and outputs single printing data. Thereafter, step S230 described above is performed to perform printing on the transfer sheet P based on the printing data.

According to the printing apparatus 100 of the third embodiment described above, the same effect as the effect of the first embodiment can be obtained. In addition to this, halftone data is generated a plurality of times for the same area of the image data of the printing target image, the second density correction value 235 is applied to each generated halftone data to print the printing target image, and thus, a difference in ink ejection tendency among the nozzles 92 can be absorbed in the same area, and deterioration of image quality in the printed image can be further suppressed.

D. Other Embodiments (1) In the second embodiment, the second density correction value 235 of the overlapping area EAr1 is calculated based on the first density correction value 234 of the end portion area TAr1 of the non-overlapping area SAr1 and the first density correction value 234 of the end portion area TAr2 of the non-overlapping area SAr2, but the present disclosure is not limited to this. For example, the second density correction value 235 of the overlapping area EAr1 is not limited to the end portion areas TAr1 and TAr2 and may be calculated based on the first density correction value 234 of any area in the non-overlapping areas SAr1 and SAr2. It is preferable that any area in the non-overlapping areas SAr1 and SAr2 is an area closer to the overlapping area EAr1 in the respective non-overlapping areas SAr1 and SAr2. Also in such a configuration, the same effect as the effect of the second embodiment can be obtained.

(2) In the second embodiment, the second density correction value calculation unit 223 may calculate the second density correction value 235 for yellow ink based on the first density correction value 234 for cyan ink. Specifically, in the density correction value determination processing illustrated in FIG. 3, the printing control unit 221 ejects cyan ink from the plurality of nozzles 92 included in the first nozzle array CL1 in step S105 described above and prints test pattern data 232. Thereafter, steps S110 to S120 described above are performed, and the first density correction value calculation unit 222 calculates the first density correction value 234 for cyan ink. Thereafter, in step S125 described above, the second density correction value calculation unit 223 calculates the first density correction value 234 for cyan ink as the second density correction value 235 for yellow ink of the second nozzle array YL1.

As such, the reason why the second density correction value 235 for yellow ink is calculated based on the first density correction value 234 for cyan ink is as follows. If the test pattern data 232 is printed on the white transfer sheet P, it is difficult to visually recognize ink of light color or yellow color, and it is possible to accurately detect a dot density in captured image data. In general, the nozzle arrays disposed in the same printing chip have similar ink ejection tendencies, such as ejection speed and ejection direction of the ink droplet. For example, in the first printing head Hd1 illustrated in FIG. 11, the first nozzle array CL1 and the second nozzle array YL1 have similar ink ejection tendencies, and in the second printing head Hd2, the fifth nozzle array ML3 and the sixth nozzle array KL3 have similar ink ejection tendencies.

Therefore, in a configuration in which nozzle arrays that eject ink having different colors in lightness are disposed in the same printing chip, the second density correction value 235 of an ink color having higher lightness can be calculated accurately by calculating the second density correction value 235 of the other nozzle array that ejects ink of color having higher lightness such as yellow ink, based on the first density correction value 234 of the nozzle array that ejects ink of color having lower lightness such as cyan ink. In addition, it is possible to reduce time required for density correction value determination processing. Also in such a configuration, the same effect as the effect of the second embodiment can be obtained. The first nozzle array CL1 corresponds to a subordinate concept of the first color nozzle array in the present application. The second nozzle array YL1 corresponds to a subordinate concept of the second color nozzle array in the present application. The first density correction value 234 for cyan ink corresponds to a subordinate concept of the density correction value for the first color ink in the present application. The second density correction value 235 for yellow ink corresponds to a subordinate concept of the density correction value for the second color ink in the present application.

(3) In another embodiment (2) described above, a combination of the ink colors for which the second density correction value 235 is calculated based on the first density correction value 234 is not limited to cyan ink and yellow ink. For example, the second density correction value 235 for yellow ink may be calculated based on the first density correction value 234 for light gray ink, or the second density correction value 235 for light cyan ink may be calculated based on the first density correction value 234 for cyan ink. That is, in general, the same effect as in another embodiment (2) described above is obtained in the configuration in which the printing heads 410 or 410a includes the printing chip having a nozzle array for a first color ink and a nozzle array for a second color ink having a higher brightness than the first color ink and calculates the second density correction value 235 for the second color ink based on the first density correction value 234 for the first color ink.

(4) In the above-described embodiments, the printing apparatus 100 is an ink jet printer of a sublimation transfer type, but the printing apparatus 100 may be a printing apparatus of various types such as a bubble jet (registered trademark) type and a multifunction machine instead of the sublimation transfer type. In a configuration in which the sublimation transfer type is not used for the printing apparatus 100, a printing medium of any other type, such as normal paper and photographic paper, may be used as the printing medium instead of the transfer paper. Also in such a configuration, the same effects as the effects of the above-described embodiments are obtained.

(5) In the respective embodiments described above, the captured image data of the printed test pattern TP is acquired by the imaging unit 420, but the present disclosure is not limited thereto. For example, in a configuration in which the carriage 400 does not include the imaging unit 420, the captured image data may be acquired by using a scanner included in the printing apparatus 100 or a scanner different from the scanner of the printing apparatus 100, and the control unit 200 may receive the acquired captured image data. Also in such a configuration, the same effects as the effects of the above-described embodiments are obtained.

(6) In the respective embodiments described above, a part of the configuration realized by hardware may be replaced with software, or, conversely, a part of the configuration realized by the software may be replaced with the hardware. When a part or all of the functions of the present disclosure are realized by software, the software (computer program) can be provided in a manner in which the software is stored in a computer readable recording medium. In the present disclosure, the "computer readable recording medium" is not limited to a portable type recording medium such as a flexible disk or a CD-ROM, and also includes an external storage device fixed to internal storage devices in computer such as various RAMs and ROMs, or a computer such as a hard disk. That is, the "computer readable recording medium" has broad meaning including any recording medium that can fix data not temporarily.

The present disclosure is not limited to the above-described embodiments and can be realized in various configurations without departing from the scope of the present disclosure. For example, technical features of the embodiments corresponding to the technical features of the respective forms described in the section of the summary of the present disclosure can be replaced or combined as appropriate in order to solve a part or all of the problems described above, or in order to achieve a part or all of the effects described above. If the technical feature is not described as essential in the present specification, appropriate removal can be made.

E. Other Forms (1) According to an embodiment of the present disclosure, a method of determining a density correction value for correcting a printing density in a printing apparatus that performs printing by ejecting ink from a plurality of nozzles onto a medium is provided. In the method of determining the density correction value, a test pattern is printed by ejecting the ink from the plurality of nozzles, captured image data is acquired by imaging the printed test pattern, a first density correction value for bringing the printing density closer to a predetermined reference value is calculated when one raster is formed by ejecting the ink from each single nozzle of the plurality of nozzles, based on a density of the acquired captured image data, and a second density correction value for bringing the printing density closer to a predetermined reference value is calculated when one raster is formed by combining different nozzles of the plurality of nozzles, based on the calculated first density correction value.

According to the method of determining the density correction value of this form, captured image data of the printed test pattern is acquired, a first density correction value for bringing the printing density closer to a predetermined reference value is calculated when one raster is formed by ejecting ink from each single nozzle of the plurality of nozzles, based on a density of the acquired captured image data, a second density correction value for bringing the printing density closer to a predetermined reference value is calculated when one raster is formed by combining different nozzles of the plurality of nozzles, based on the calculated first density correction value, and thereby, it is possible to reduce time for calculating the density correction value as compared with the configuration in which the density correction value is calculated for each combination of nozzles when one raster is formed by combining different nozzles of the plurality of nozzles.

(2) In the method of determining the density correction value according to the above-described form, a printing apparatus may include a printing head in which a first printing chip having a first nozzle array where some nozzles of a plurality of nozzles are aligned in a first direction, and a second printing chip having a second nozzle array where other some nozzles different from the some nozzles among the plurality of nozzles are aligned in the first direction such that a part of the first printing chip overlaps a part of the second printing chip when viewed in a second direction intersecting the first direction. The printing apparatus may calculate the second density correction value of an overlapping area which is an area where the first printing chip and the second printing chip overlap each other when viewed in the second direction, based on the first density correction value of a non-overlapping area which is an area excluding the overlapping area.

According to the method of determining the density correction value of this form, the second density correction value of the overlapping area, which is an area where the first printing chip and the second printing chip overlap each other when viewed in the second direction, is calculated based on the first density correction value of the non-overlapping area, and thereby, it is possible to calculate accurately the second density correction value of the overlapping area, and to suppress deterioration in image quality of a printing image.

(3) In the method of determining the density correction value according to the above-described form, the second density correction value of the overlapping area may be calculated based on the first density correction value which is a value of an end portion area in the non-overlapping area and on a boundary side with the overlapping area.

According to the method of determining the density correction value of this form, since the second density correction value of the overlapping area is calculated based on the first density correction value which is a value of an end portion area in the non-overlapping area and on the boundary side with the overlapping area, the second density correction value of the overlapping area can be calculated accurately.

(4) In the method of determining the density correction value according to the above-described form, a printing apparatus may include a printing head including a third printing chip having a third nozzle array in which a plurality of first color nozzles for ejecting first color ink are aligned in the first direction and a fourth nozzle array in which a plurality of second color nozzles for ejecting second color ink having higher lightness than the lightness of the first color ink are aligned in the first direction, a test pattern may be printed by ejecting the first color ink from the plurality of first color nozzles, a density correction value for a first color ink for bringing a printing density closer to a predetermined reference value may be calculated when the one raster is formed by ejecting the first color ink from a single first color nozzle of each of a plurality of the first color nozzles, and a density correction value for a second color ink for bringing a printing density closer to a predetermined reference value may be calculated when the one raster is formed by ejecting the second color ink from each single second color nozzle of a plurality of the second color nozzles, based on the calculated density correction value for the first color ink.

According to the method of determining the density correction value of this form, the test pattern is printed by ejecting a first color ink from a plurality of first color nozzles, a density correction value for a first color ink for bringing a printing density closer to a predetermined reference value is calculated when one raster is formed by ejecting the first color ink from each single first color nozzle of a plurality of first color nozzles, a density correction value for a second color ink for bringing the printing density closer to a predetermined reference value may be calculated when the one raster is formed by ejecting the second color ink from each single second color nozzle of a plurality of the second color nozzles, based on the calculated density correction value for the first color ink, and thereby, it is possible to accurately calculate the density correction value for the second color ink as compared with a configuration in which the test pattern is printed by ejecting the second color ink and the density correction value for the second color ink is calculated by using captured image data of the printed test pattern.

(5) According to another form of the present disclosure, a printing apparatus which prints a printing target image by ejecting ink from a plurality of nozzles onto a medium is provided. The printing apparatus includes a printing control unit that ejects the ink from the plurality of nozzles to print a test pattern, a first density correction value calculation unit that acquires captured image data by imaging the printed test pattern and calculates a first density correction value for bringing a printing density set when one raster is formed by ejecting the ink from each single nozzle of the plurality of nozzles closer to a predetermined reference value, based on a density of the captured image data, and a second density correction value calculation unit that calculates a second density correction value for bringing a printing density set when the one raster is formed by combining different nozzles of the plurality of nozzles closer to a predetermined reference value, based on the calculated first density correction value. Here, the printing control unit prints the printing target image by ejecting the ink from the plurality of nozzles based on the calculated second density correction value.

According to the printing apparatus of this form, a test pattern is printed, a first density correction value is calculated based on a density of captured image data of the printed test pattern, a second density correction value is calculated based on the calculated first density correction value, a printing target image is printed based on the calculated second density correction value, and thereby, it is possible to suppress occurrence of unevenness of the printing density in the printing image, and to suppress deterioration in printing image quality.

(6) The printing apparatus of the above-described form may further include a halftone data generation unit that performs halftone processing of generating halftone data indicating presence or absence of an ink dot on the medium of the printing apparatus from image data of the printing target image, for the same area of the image data a plurality of times, and the printing control unit may print the printing target image by applying the calculated second density correction value to each of the generated halftone data.

According to the printing apparatus of this form, halftone data is generated a plurality of times for the same area of image data of a printing target image, and the printing target image is printed by applying a second density correction value to each of the generated halftone data, and thus, it is possible to absorb a difference in the ink ejection tendency for each nozzle in the same area, and to suppress deterioration in image quality of a printing image.

The present disclosure can also be realized in various forms. The present disclosure can be realized in the forms of, for example, a printing apparatus, a printing method, a printing system including an encoding apparatus and the printing apparatus, a computer program for realizing the apparatus, the method and the system, a recording medium in which the computer program is recorded, and the like.

What is claimed is:

1. A determining method of a density correction value for correcting a printing density in a printing apparatus that performs printing by ejecting ink from a plurality of nozzles onto a medium, the method comprising:
   printing a test pattern by ejecting the ink from the plurality of nozzles;
   acquiring captured image data by imaging the printed test pattern;
   calculating a first density correction value for bringing the printing density closer to a predetermined reference value set when one raster is formed by ejecting the ink from each single nozzle of the plurality of nozzles, based on a density of the acquired captured image data; and
   calculating a second density correction value for bringing the printing density closer to a predetermined reference value set when the one raster is formed by combining different nozzles of the plurality of nozzles, based on the calculated first density correction value.

2. The density correction value determining method according to claim 1, wherein
   the printing apparatus includes a printing head in which a first printing chip having a first nozzle array where some nozzles of the plurality of nozzles are aligned in a first direction, and a second printing chip having a second nozzle array where other some nozzles different from the some nozzles among the plurality of nozzles are aligned in the first direction are disposed such that a part of the first printing chip overlaps a part of the second printing chip when viewed in a second direction intersecting the first direction, and
   the method further comprises:
   calculating the second density correction value of an overlapping area which is an area where the first printing chip and the second printing chip overlap each other when viewed in the second direction, based on the first density correction value of a non-overlapping area which is an area excluding the overlapping area.

3. The density correction value determining method according to claim 2, wherein
   the second density correction value of the overlapping area is calculated based on the first density correction value of an end portion area in the non-overlapping area which is an end portion area on a boundary side of the non-overlapping area with the overlapping area.

4. The density correction value determining method according to claim 2, wherein
   the printing apparatus further includes a printing head including a third printing chip having a third nozzle array in which a plurality of first color nozzles that eject first color ink are aligned in the first direction, and a fourth nozzle array in which a plurality of second color nozzles that eject second color ink having lightness higher than lightness of the first color ink are aligned in the first direction,
   the method further comprises:
   printing the test pattern by ejecting the first color ink from the plurality of first color nozzles;
   calculating a density correction value for the first color ink for bringing the printing density closer to a predetermined reference value set when the one raster is formed by ejecting the first color ink from each single first color nozzle of the plurality of first color nozzles; and
   calculating a density correction value for the second color ink for bringing the printing density closer to a predetermined reference value set when the one raster is formed by ejecting the second color ink from each single second color nozzle of the plurality of second color nozzles, based on the calculated density correction value for the first color ink.

5. A printing apparatus that prints a printing target image by ejecting ink from a plurality of nozzles onto a medium, the apparatus comprising:
   a printing control unit that prints a test pattern by ejecting the ink from the plurality of nozzles;
   a first density correction value calculation unit that acquires captured image data by imaging the printed test pattern and calculates a first density correction value for bringing the printing density closer to a predetermined reference value set when one raster is formed by ejecting the ink from each single nozzle of the plurality of nozzles, based on a density of the captured image data; and
   a second density correction value calculation unit that calculates a second density correction value for bringing the printing density closer to a predetermined reference value set when the one raster is formed by combining different nozzles of the plurality of nozzles, based on the calculated first density correction value, wherein
   the printing control unit prints the printing target image by ejecting the ink from the plurality of nozzles based on the calculated second density correction value.

6. The printing apparatus according to claim 5, further comprising:
   a halftone data generation unit that performs halftone processing of generating halftone data indicating presence or absence of an ink dot on the medium in the printing apparatus from image data of the printing target image a plurality of times for the same area of the image data, wherein the printing control unit prints the printing target image by applying the calculated second density correction value to each of the generated halftone data.

7. A printing method of a printing apparatus that prints a printing target image by ejecting ink from a plurality of nozzles onto a medium, the method comprising:

printing a test pattern by ejecting the ink from the plurality of nozzles;

acquiring captured image data by imaging the printed test pattern;

calculating a first density correction value for bringing the printing density closer to a predetermined reference value set when one raster is formed by ejecting the ink from each single nozzle of the plurality of nozzles, based on a density of the acquired captured image data;

calculating a second density correction value for bringing the printing density closer to a predetermined reference value set when the one raster is formed by combining different nozzles of the plurality of nozzles, based on the calculated first density correction value; and forming the one raster by ejecting the ink from the plurality of nozzles based on the second density correction value.

8. A method of correcting a printing density in a printing apparatus that performs printing by ejecting ink from a plurality of nozzles onto a medium, the method comprising:

printing a test pattern by ejecting the ink from the plurality of nozzles;

acquiring captured image data by imaging the printed test pattern;

calculating a first density correction value for bringing the printing density closer to a predetermined reference value set when one raster is formed by ejecting the ink from each single nozzle of the plurality of nozzles, based on a density of the acquired captured image data;

calculating a second density correction value for bringing the printing density closer to a predetermined reference value set when the one raster is formed by combining different nozzles of the plurality of nozzles, based on the calculated first density correction value; and correcting the printing density when the one raster is formed by ejecting the ink from the plurality of nozzles, based on the second density correction value.

\* \* \* \* \*